(12) United States Patent
Tauchi

(10) Patent No.: US 9,013,080 B2
(45) Date of Patent: Apr. 21, 2015

(54) BICYCLE GENERATOR

(71) Applicant: Shimano Inc., Sakai-ku, Sakai, Osaka (JP)

(72) Inventor: Mitsuru Tauchi, Sakai (JP)

(73) Assignee: Shimano Inc., Sakai, Osaka (JP)

( * ) Notice: Subject to any disclaimer, the term of this patent is extended or adjusted under 35 U.S.C. 154(b) by 241 days.

(21) Appl. No.: 13/632,989

(22) Filed: Oct. 1, 2012

(65) Prior Publication Data

US 2014/0091681 A1    Apr. 3, 2014

(51) Int. Cl.
*H02K 7/18* (2006.01)
*B62J 6/06* (2006.01)
*H02K 7/116* (2006.01)
*H02K 7/108* (2006.01)

(52) U.S. Cl.
CPC . *B62J 6/06* (2013.01); *H02K 7/116* (2013.01); *H02K 7/108* (2013.01); *H02K 7/1846* (2013.01)

(58) Field of Classification Search
CPC ..... H02K 7/108; H02K 7/1846; H02K 1/116; B62J 6/10; B62J 6/06
USPC ............. 310/75 R, 75 C, 103, 112–114, 67 R
See application file for complete search history.

(56) References Cited

U.S. PATENT DOCUMENTS

| 2,762,939 | A | * | 9/1956 | Hodgson | 310/102 R |
| 7,002,280 | B2 | | 2/2006 | Endo | |
| 8,884,491 | B2 | * | 11/2014 | Kusase | 310/266 |
| 2002/0117916 | A1 | * | 8/2002 | Terada | 310/75 C |
| 2003/0234587 | A1 | * | 12/2003 | Sjoberg | 310/67 R |
| 2004/0108781 | A1 | * | 6/2004 | Razzell et al. | 310/112 |

FOREIGN PATENT DOCUMENTS

JP    2007230340 A    9/2007

* cited by examiner

*Primary Examiner* — Dang Le
*Assistant Examiner* — Leda Pham
(74) *Attorney, Agent, or Firm* — Jeffer Mangels Butler & Mitchell LLP; Brennan C. Swain, Esq

(57) ABSTRACT

A bicycle generator that includes a stator, a rotating member defining a rotating axis, a magnet arranged so as to face the stator, a first transmission structure that transmits rotational motion of the rotating member to the magnet at a first rotational speed ratio when the rotating member rotates in a first direction, and a second transmission structure that transmits rotational motion of the rotating member to the magnet at a second rotational speed ratio when the rotating member rotates in a second direction. The second rotational speed ratio is greater than the first rotational speed ratio.

20 Claims, 2 Drawing Sheets

BICYCLE GENERATOR

FIELD OF THE INVENTION

The present invention relates to generators, and more specifically to a generator for a bicycle.

BACKGROUND OF THE INVENTION

There are known bicycle generators that are used for charging different components associated with the bicycle, such as an electric shifting system or lights. For example, Japanese Patent Application Publication No. JP2007230340A, the entirety of which is incorporated herein by reference, discloses a generator that is disposed in the bottom bracket of a bicycle and is used for charging an electric shifting system. U.S. Pat. No. 7,002,280 (the "'280 patent"), the entirety of which is incorporated herein by reference discloses a generator or dynamo that is disposed in the hub of the bicycle.

In view of the above, there exists a need for an improved bicycle generator. This invention addresses this need in the art as well as other needs, which will become apparent from this disclosure to those skilled in the art.

SUMMARY OF THE PREFERRED EMBODIMENTS

In accordance with a first aspect of the present invention there is provided a bicycle generator that includes a stator, a rotating member defining a rotating axis, a magnet arranged so as to face the stator, a first transmission structure that transmits rotational motion of the rotating member to the magnet at a first rotational speed ratio when the rotating member rotates in a first direction, and a second transmission structure that transmits rotational motion of the rotating member to the magnet at a second rotational speed ratio when the rotating member rotates in a second direction. The second rotational speed ratio is greater than the first rotational speed ratio. In a preferred embodiment, the bicycle generator includes a base member that fixedly supports the base member and the first transmission structure includes a first one-way clutch disposed between the magnet and the rotating member, and the second transmission structure includes a second one-way clutch disposed between the magnet and the rotating member and a planetary gear mechanism disposed between the magnet and the rotating member. Preferably, the second one-way clutch is disposed between the rotating member and the planetary gear mechanism, which includes a ring gear member and at least one planetary gear member that are disposed between the second one-way clutch and the magnet. In a preferred embodiment, the bicycle generator includes a support member that supports the magnet and is disposed between the planetary gear member and the magnet. Preferably, the first transmission structure only transmits rotational motion to the magnet when the rotating member rotates in the first direction and the second transmission structure only transmits rotational motion to the magnet when the rotating member rotates in the second direction.

The invention, together with additional features and advantages thereof, may be best understood by reference to the following description.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
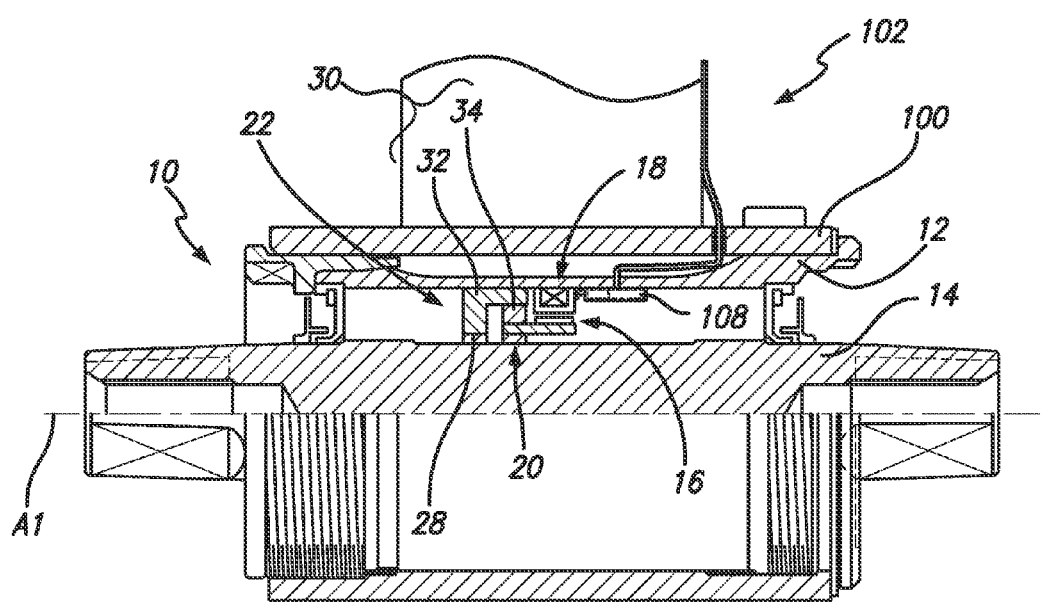
FIG. 1 is a partial cross-sectional view of the bottom bracket and crank of a bicycle that includes a generator in accordance with a preferred embodiment of the present invention.

Referring initially to FIG. 1, a generator 10 is illustrated in accordance with an embodiment of the present invention. In a preferred embodiment, the generator 10 is constructed as a bottom bracket bearing unit disposed or mounted in the bottom bracket 100 of a bicycle 102. However, this is not a limitation on the present invention. The generator of the present invention can be constructed as other devices that include a rotating member, rod or axle. Specifically, the generator of the present invention can also be constructed as a front or rear generator hub.

Figure 2:
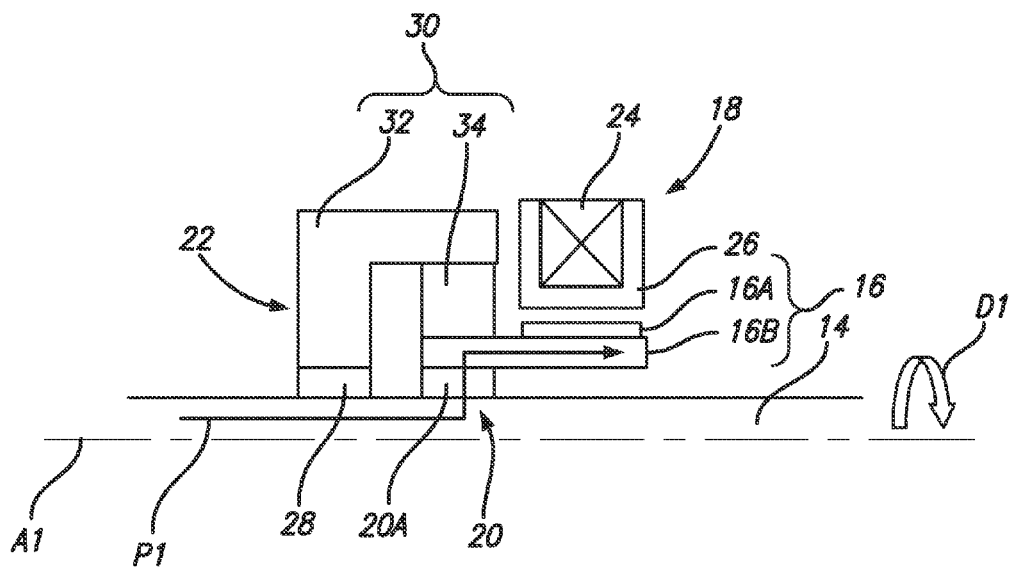
FIG. 2 is a schematic view of the generator showing transmission of rotational motion from the crank to the magnet when the crank is rotated in the first direction.
Figure 3:
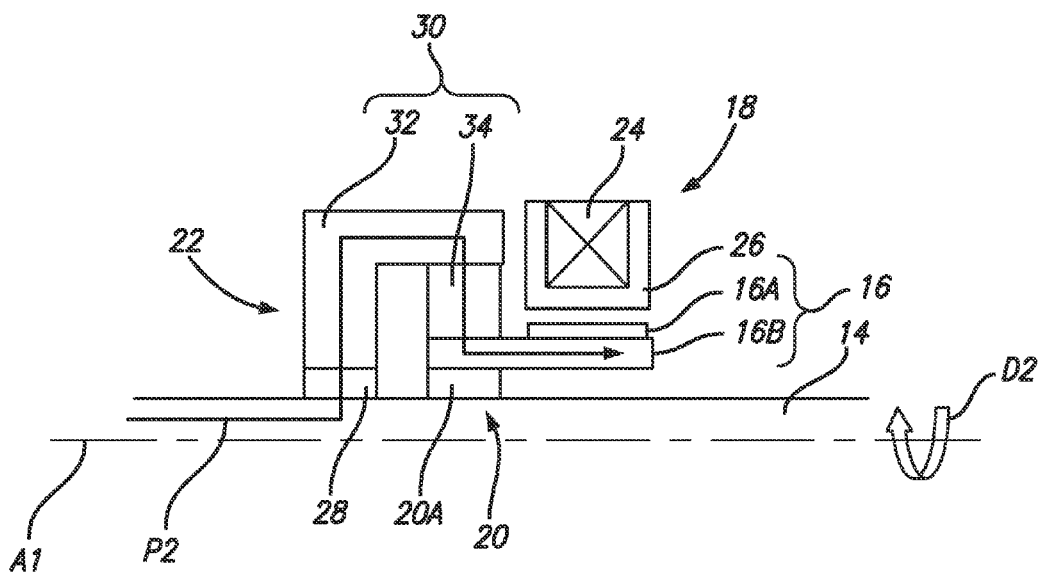
FIG. 3 is a schematic view of the generator showing transmission of rotational motion from the crank to the magnet when the crank is rotated in the second direction.

FIG. 1 is a partial cross-sectional view of the bottom bracket 100 (which is generally cylindrical) and the generator 10. As shown in FIGS. 1-3, the generator 10 includes a base member 12, a crank axle 14, a magnet unit 16, a stator 18, a first transmission structure 20 and a second transmission structure 22. In a preferred embodiment, the base member 12 is a bearing adaptor. The base member 12 has a cylindrical shape and is fixed to the bottom bracket 100. The crank axle 14 extends through the base member 12. The crank axle 14 is rotatably supported by the base member 12 via two bearing units (not shown) disposed at two opening end portions of the base member 12, respectively. Since it will be apparent that a relationship between the base member 12 and the crank axle 14 via the bearing units is well known by those skilled in the bicycle, the relationship will not be specifically discussed herein for sake of brevity. The crank axle 14 corresponds to a rotating member and defines a rotating axis A1 extending therethrough. As is known in the prior art, the crank axle 14 is connected to crank arms and pedals (not shown) for imparting rotational motion to the crank axle 14. The stator 18 is fixedly supported by the base member 12.

As is shown in FIGS. 2 and 3, the stator 18 includes a ring-shaped coil 24 and a yoke 26 that is disposed such that it surrounds the coil 24. The '280 patent discloses an exemplary embodiment of a yoke, coil and other components in a bicycle generator, and the coil 24 and the yoke 26 will not be specifically discussed herein for sake of brevity. In a preferred embodiment, the magnet unit 16 includes an even number of individual magnets 16A (only a single individual magnet 16A is shown in FIGS. 2 and 3) and a support member 16B. The even number of individual magnets 16A are spaced at approximately equal intervals along the circumferential direction and are magnetized with alternating N and S poles disposed at equal intervals along the circumferential direction, and each face the yoke 26. The support member 16B preferably has a cylindrical shape. The support member 16B is essentially the sun gear within the planetary gear mechanism (discussed below) and supports the magnets 16A for rotating with respect to the stator 18. As is known in the art, the interaction of the rotating magnet unit 16 (described below) and the stator 18 generates electricity that can be used as desired (e.g., charging a battery 108).

In a preferred embodiment, the first and second transmission structures 20 and 22 are mounted on the crank axle 14. The first transmission structure 20 includes a first one-way clutch 20A mounted on the crank axle 14. The first transmission structure 20 provides a first transmission path P1 for transmitting the rotational motion of the crank axle 14 to the magnet unit 16. On the first transmission path P1, the first one-way clutch 20A is disposed between the magnet unit 16 and the crank axle 14. It will be understood that, as used herein, "between" does not necessarily mean between two components in a circumferential direction, but means between two components within the gear train or the transmission path.

The second transmission structure 22 includes a second one-way clutch 28 and a planetary gear mechanism 30. The second transmission structure 22 provides a second transmission path P2 for transmitting the rotational motion of the crank axle 14 to the magnet unit 16. On the second transmission path P2, the second one-way clutch 28 is disposed between the magnet unit 16 and the planetary gear mechanism 30 and is disposed between the crank axle 14 and the he planetary gear mechanism 30.

As is shown best in FIGS. 2 and 3, the second one-way clutch 28 is mounted on the crank axle 14. The planetary gear mechanism 30 includes a ring gear member 32, and a plurality of planetary gear members 34 (only a single planetary gear member 34 is shown in FIGS. 2 and 3). The ring gear member 32 is rotatably engaged with the second one-way clutch 28. The planetary gear members 34 are disposed between the ring gear member 32 and the support member 16B (sun gear 16B) of the magnet unit 16 and are rotatably engaged with the ring gear member 32 and the support member 16B. The planetary gear members 34 are rotatably supported by a support structure (not shown) fixed to the base member 12 such that the planetary gear members 34 are prevented from displacing with respect to the base member 12. Those of ordinary skill in the art will understand the operation of the planetary gear mechanism 30 and the gear connections between the ring gear member 32, planetary gear members 34, support member 16B, first and second one-way clutches 20A and 28, and the magnet unit 16.

As shown in FIGS. 2 and 3, in a preferred embodiment, the first transmission path P1 extends from the crank axle 14 to the first transmission structure 20 (the first one-way clutch 20A) and to the magnet unit 16. Preferably, the first transmission path P1 is the transmission path for when the crank axle 14 is rotated or pedaled by a rider in the drive direction D1 (the clockwise direction when viewing a bicycle from the right side). Preferably, the second transmission path P2 extends from the crank axle 14 to the second one-way clutch 28, to the ring gear member 32, the planetary gear members 34 and to the magnet unit 16. Preferably, the second transmission path P2 is the transmission path for when the crank axle 14 is rotated or pedaled by a rider in the non-drive direction D2 (i.e., backwards or in the counter-clockwise direction when viewing a bicycle from the right side). In other words, in a preferred embodiment, the first one-way clutch 20A connects the magnet unit 16 and the crank axle 14 when the crank axle 14 rotates in the drive direction D1 and the second one-way clutch 28, ring gear member 32, and planetary gear members 34 connect the magnet unit 16 and the crank axle 14 when the crank axle 14 rotates in the non-drive direction D2.

In operation, when the crank axle 14 is rotated in the drive direction D1, the rotational speed of the magnet unit 16 (magnet 16A) is approximately equal to the rotational speed of the crank axle 14 (via the first transmission path P1). In other words, when the crank axle 14 is rotated in the drive direction D1, the first transmission structure 20 transmits rotational motion of the crank axle 14 to the magnet unit 16 at a first rotational speed ratio. As the magnet unit 16 rotates with respect to the stator 18, electricity is generated and stored in battery 108 at a first rate. On the other hand, when the crank axle 14 is rotated in the non-drive direction D2, as a result of the gearing in the planetary gear mechanism 30, the rotational speed of the magnet unit 16 is greater than the rotational speed of the crank axle 14 (via the second transmission path P2). In other words, when the crank axle 14 is rotated in the non-drive direction D2, the second transmission structure 22 transmits rotational motion of the crank axle 14 to the magnet unit 16 at a second rotational speed ratio that is greater than the first rotational speed ratio. As the magnet unit 16 rotates with respect to the stator 18, electricity is generated and stored in battery 108 at a second rate, which is higher or faster than the first rate. As used herein, "rotational speed" means speed of revolution or the number of complete rotations or revolutions per time unit. Further, "rotational speed ratio" means the ratio of the rotational speed of the magnet unit 16 (magnet 16A) with respect to the rotational speed of the crank axle 14 and the rotational speed of the magnet unit 16 (magnet 16A) divided by the rotational speed of the crank axle 14 equals the "rotational speed ratio".

In a preferred embodiment, the first rotational speed ratio is 1 (or 1:1) and the second rotational speed ratio is greater than 1 (or 1:1). In another preferred embodiment, the second rotational speed ratio is between about 9 (or 9:1) and about 300 (or 300:1). However, none of these ratios are a limitation on the present invention, as long as the second rotational speed ratio is greater than the first rotational speed ratio.

The gear train described herein (e.g., the planetary gear mechanism) is not a limitation on the present invention. Any transmission structure that transmits the rotational motion of the rotating member or crank axle 14 to the magnet 16A such that the magnet 16A rotates at a different speed ratio in one direction than in the opposite direction is within the scope of the present invention. In other words, any construction that the rotational speed of the magnet 16A via the second transmission structure is greater than the rotational speed of the magnet 16A via the first transmission structure in a condition that rotational speed of the crank axle 14 is same, is within the scope of the present invention.

With this construction, a rider can charge the battery 108 by rotating the crank axle 14 in the non-drive direction D2 when the rider first starts to ride the bicycle and at other times when desired.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," "member" or "element" when used in the singular can have the dual meaning of a single part or a plurality of parts. As used herein to describe the above embodiment(s), the following directional terms "forward," "rearward," "rightward," "leftward," "outward," "forward," "inward," "downward," "upward," "above," "below," "vertical," "horizontal," and "transverse" as well as any other similar directional terms refer to those directions of a bicycle equipped with the bicycle control device. Accordingly, these terms, as utilized to describe the bicycle control device should be interpreted relative to a bicycle equipped with the bicycle control device as used in the normal riding position on a level surface. Finally, terms of degree such as "substantially," "about" and "approximately" as used herein mean a reasonable amount of deviation of the modified term such that the end result is not significantly changed.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A bicycle generator comprising:
a stator,
a rotating member defining a rotating axis,
a magnet arranged so as to face the stator,
a first transmission structure that transmits rotational motion of the rotating member to the magnet at a first rotational speed ratio when the rotating member rotates in a first direction, and
a second transmission structure that transmits rotational motion of the rotating member to the magnet at a second rotational speed ratio when the rotating member rotates in a second direction, wherein the second rotational speed ratio is greater than the first rotational speed ratio.

2. The bicycle generator of claim 1 further comprising a base member, wherein the stator is fixedly supported by the base member, and wherein the rotating member is rotatable with respect to the base member.

3. The bicycle generator of claim 2 wherein the base member has a cylindrical shape and is fixed to a bicycle frame, wherein the rotating member is a bicycle crank axle, and wherein the bicycle crank axle extends through the base member.

4. The bicycle generator of claim 1 wherein the first rotational speed ratio is 1:1.

5. The bicycle generator of claim 4 wherein the second rotational speed ratio is greater than 9:1.

6. The bicycle generator of claim 1 wherein the first transmission structure includes a first one-way clutch disposed between the magnet and the rotating member, and the second transmission structure includes a second one-way clutch disposed between the magnet and the rotating member and a planetary gear mechanism disposed between the magnet and the rotating member.

7. The bicycle generator of claim 6 wherein the second one-way clutch is disposed between the rotating member and the planetary gear mechanism.

8. The bicycle generator of claim 7 wherein the planetary gear mechanism includes a ring gear member and at least one planetary gear member that are disposed between the second one-way clutch and the magnet.

9. The bicycle generator of claim 8 further comprising a support member disposed between the planetary gear member and the magnet, wherein the magnet is supported by the support member.

10. The bicycle generator of claim 1 wherein the magnet rotates about the rotating axis.

11. The bicycle generator of claim 1 wherein the first transmission structure only transmits rotational motion to the magnet when the rotating member rotates in the first direction and wherein the second transmission structure only transmits rotational motion to the magnet when the rotating member rotates in the second direction.

12. A bicycle generator comprising:
a stator mounted in a bicycle bottom bracket,
a crank axle defining a rotating axis, wherein the crank axle extends through the bottom bracket,
a magnet arranged so as to face the stator,
a first transmission structure that transmits rotational motion of the crank axle to the magnet at a first rotational speed ratio when the crank axle is rotated in a drive direction, and
a second transmission structure that transmits rotational motion of the crank axle to the magnet at a second rotational speed ratio when the crank axle is rotated in a non-drive direction, wherein the second rotational speed ratio is greater than the first rotational speed ratio.

13. The bicycle generator of claim 12 wherein the crank axle has opposite ends that each include a crank arm and a pedal.

14. The bicycle generator of claim 12 wherein the first rotational speed ratio is 1:1.

15. The bicycle generator of claim 14 wherein the second rotational speed ratio is greater than 9:1.

16. The bicycle generator of claim 12 wherein the first transmission structure includes a first one-way clutch disposed between the magnet and the crank axle, and the second transmission structure includes a second one-way clutch disposed between the magnet and the crank axle and a planetary gear mechanism disposed between the magnet and the crank axle.

17. The bicycle generator of claim 16 wherein the second one-way clutch is disposed between the crank axle and the planetary gear mechanism.

18. The bicycle generator of claim 17 wherein the planetary gear mechanism includes a ring gear member and at least one planetary gear member that are disposed between the second one-way clutch and the magnet.

19. The bicycle generator of claim 18 further comprising a support member disposed between the planetary gear member and the magnet, wherein the magnet is supported by the support member.

20. The bicycle generator of claim 12 wherein the first transmission structure only transmits rotational motion to the magnet when the rotating member rotates in the drive direction and wherein the second transmission structure only transmits rotational motion to the magnet when the rotating member rotates in the non-drive direction.

* * * * *